Oct. 11, 1960

C. B. OLIVER 2,955,610

PRESSURIZED DOSAGE SYSTEM

Filed Sept. 11, 1957

INVENTOR.
Chauncey B. Oliver
BY
Cromwell, Greist & Warden
Attys.

Oct. 11, 1960 C. B. OLIVER 2,955,610
PRESSURIZED DOSAGE SYSTEM
Filed Sept. 11, 1957 2 Sheets-Sheet 2
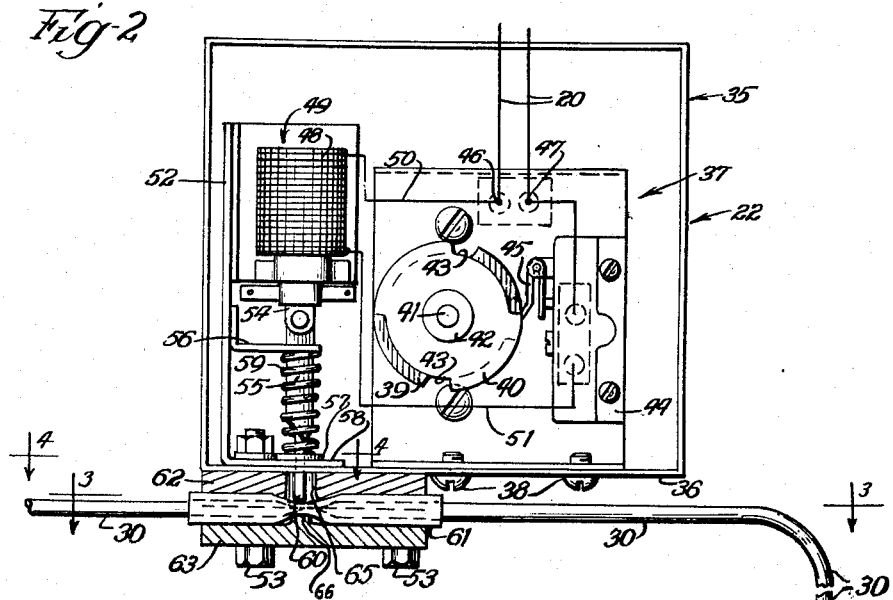
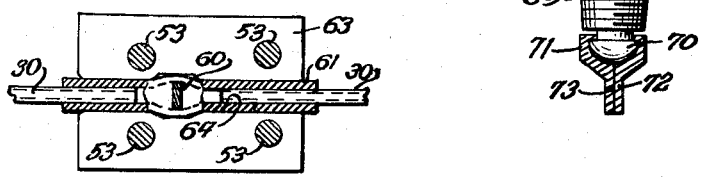
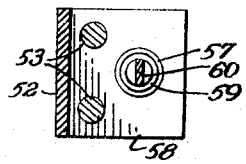
INVENTOR.
Chauncey B. Oliver
BY
Cromwell, Greist & Warden
Attys United States Patent Office 2,955,610
Patented Oct. 11, 1960

2,955,610

PRESSURIZED DOSAGE SYSTEM

Chauncey B. Oliver, Blue Diamond, Nev., assignor to Everpure Inc., Chicago, Ill., a corporation of Nevada Filed Sept. 11, 1957, Ser. No. 683,264

8 Claims. (Cl. 137—111)

This invention relates broadly to an improved system for use in accurately dosing into a body of liquid (e.g. water), which may be either stationary or flowing, a small amount of treating liquid (e.g. chlorinating solution). More particularly, the invention relates to a novel system for automatically dosing a liquid with a small quantity of treating liquid; the system including an electrically-actuated dosage control unit which automatically controls the periodic flow of the treating liquid preferably for relatively short intervals in response to the flow for a much longer time of the liquid to be dosed; the system being arranged to automatically utilize compressed air developed within the system during operation of the same to provide for maximum dosage during the period of greatest or maximum flow through the system of the liquid to be dosed while further allowing treating of the liquid at a point in the system other than the suction side of the pump forming a part thereof.

This application is a continuation-in-part of my co-pending application, Serial Number 463,427, filed October 20, 1954, and the invention disclosed herein constitutes, broadly, a modification of the general type of systems disclosed in my pending application. In the improvement of the present invention, air pressure automatically developed and contained within a water treating and supply system is utilized to provide for improved dosing of the water delivered and stored by the system; the modification having particular application to well systems of the type utilizing a submerged pump wherein it is difficult, or practically impossible, to gain access into the suction side of the submerged pump for water treating purposes. The present invention is especially useful for dosing private domestic water supply systems with chlorinating solutions. However, it will be understood that the invention is not limited to this or any particular use, but has wide application as will be further mentioned below.

As set forth in my co-pending application, satisfactory chlorinating equipment particularly suited for use in small water systems such as, for example, the water supply system of a private residence using a well as a source of water, was not previously readily available on the market. The generally known type of automatic hypochlorinators which are reasonably satisfactory for use in intermediate sized water systems and which depend upon metering orifices, venturis, or diaphragm pumps are basically unsound and unsuited for small water systems. Health authorities consider that a chlorine concentration on the order of one-tenth to two-tenths part per million residual will normally afford adequate water protection. A 5% sodium hypochlorite solution provides a satisfactory source of chlorine for treating small water supply systems. To dose water with such a sodium hypochlorite solution at the rate of two-tenths part per million of chlorine requires less than one drop of the solution for each five gallons of water treated. Thus, less than ten drops of 5% hypochlorite solution will be sufficient to dose the ordinary 50 gallon pressure storage tank of a private water system which may take a minute or so to fill.

The flow rate of chlorinating solutions are sufficiently large in the case of the automatic chlorinators forming a part of intermediate sized water systems to require the use of fairly large metering orifices or venturis and undue difficulties are not encountered with respect to clogging or regulating the flow of dosing liquids. Normally, the automatic chlorinators for such intermediate systems are continuously operated. However, when it is attempted to reduce the same type of dosing apparatus to the fractional scale which would be required for dosing much smaller water supply systems requiring only a few drops of treating solution per minute, such as those of individual homes, such dosing apparatus proves to be impractical. Metering orifices and venturis of small enough size for private water treating systems are quite easily clogged in operation. Furthermore, it is extremely difficult to maintain accurate adjustments under such very small dosing requirements.

Greatly diluting the treating solution so as to increase the flow rates to the point where they can be handled by known automatic hypochlorinators is not a satisfactory answer to the problem of chlorinating the smaller water systems for several reasons. The water used for diluting usually has at least some hardness and increases the tendency for the metering orifices to become clogged. Diluting the commercial concentrations of the treating solutions constitutes an extra step and is a likely source of error. Furthermore, diluting the treating liquid makes it necessary to greatly increase the size of the supply container for holding the treating liquid.

The dosage control means disclosed in my co-pending application as well as the present application operates on a different principle from known automatic chlorinators or other dosing apparatus and does not involve the use of metering orifices, venturis, or diaphragm pumps. A further fundamental difference resides in the fact that the dosage control means of the present invention incorporates timing means so that the undiluted dosage or treating liquid is introduced at a full flow rate usually for only a part of the time that the quantity of water being dosed is flowing. If the undiluted liquid were to flow continuously as in the prior art apparatus, tiny orifices would be required.

In line with the use of my improved dosing means, the introduction of the extremely small amount of dosing liquid into the water supply system should preferably be substantially instantaneous with the operation of the dosing control means as the latter operates periodically at very short intervals during operation of the water supply system and very small amounts of dosing liquid are introduced at any one time into the supply of water in the system. As fully disclosed herein and in my co-pending application, the improved dosing control means includes a timing motor which is driven throughout the duration of flow of the water in the system to be treated and serves to periodically open for a short predetermined interval a rapid or snap-acting valve in a treating liquid line to thus permit periodic doses of treating liquid to pass through the treating liquid line into the water system. Dosing operations of this type must be responsive in order to provide for quick and accurate movement of small treating dosages into the water system in response to the rapid action of the mechanically and electrically operated valve portion of the dosing control means.

In well water supply systems the pump used is often submerged within the well. This type of arrangement creates a problem of pump accessibility for dosage delivery connection to the suction side thereof. Preferably, the dosage delivery connection should be made at a readily accessible point in the system and if such a point, by necessity, must be on the pressure side of the pump, special means must be used to adequately overcome the pump pressure to allow dose injection into the water system.

An object of the present invention is the provision of a pressurized dosage system which utilizes air pressure automatically developed in a given liquid supply system to place the source of treating liquid forming a part of the dosage system under a positive pressure at all time during use of the dosage system to thus provide instantaneous flow of the treating liquid through the dosage system, past the dosage control means forming a part thereof and into the liquid supply system to provide for immediately responsive dosage action and to make full utilization of the quick-acting metering action of the dosage control means of the system while allowing readily accessible connection of the dosage system to the liquid supply system on the perssure isde of liquid transmission means forming a part thereof.

A further object is the provision of a combined liquid storage and supply system and pressurized dosage system wherein the latter system automatically utilizes compressed air contained in the head space of the liquid storage means forming a part of the former system to place the treating liquid of the dosage system under pressurized air to force a small quantity of the same through the dosage system in response to operation of the same for liquid treating purposes, the dosage system including means for fully controlling use of pressurized air obtained from the liquid storage and supply system so that maximum air pressure is trapped or retained in the dosage system prior to reduction in air pressure in the liquid storage and supply system, the pressurized air trapped or retained in the dosage system being available for use during re-establishment of the requisite degree of pressurized air in the liquid storage and supply system for subsequent transmission to the dosage system in such a manner that continuous operation of the combined systems is possible without manual manipulation or control of the same and with interconnection of the systems on the pressure liquid delivery side of the supply system.

Another object of the invention is the provision of a reliable, inexpensive, easily-installed pressurized dosage system especially fitted for small water systems of the type used in rural and suburban homes and farm buildings which use an electric pump to supply the system from a well, pond, or other source, and whrein the dosage system has a timing motor which operates when the pump is running and which serves to actuate means for periodically fully opening a treating liquid line so as to periodically release accurately measured doses of treating liquid into the water system on the pressure side of the pump, pressurization of the dosage system being obtained from standard and conventional operation of the small water system without the necessity of utilizing a separate pressurized air source for connection to the dosage system.

Certain other objects of the invention will, in part, be obvious and will, in part, appear hereinafter.

For a more complete understanding of the nature and scope of the invention, reference may now be had to the following description thereof taken in conjunction with the accompanying drawings, wherein:

Fig. 2 is a view on an enlarged scale of the dosage control unit shown in Fig. 1, including a front elevational view, partly in vertical section, which illustrates the interior and working parts of a control mechanism constituting an important part of the dosage unit;

Fig. 3 is a fragmentary view and horizontal cross section along line 3—3 of Fig. 2 further illustrating the valve of the control mechanism shown in Fig. 2, and Fig. 4 is a detailed view and horizontal section along line 4—4 of Fig. 2.

Figure 1:
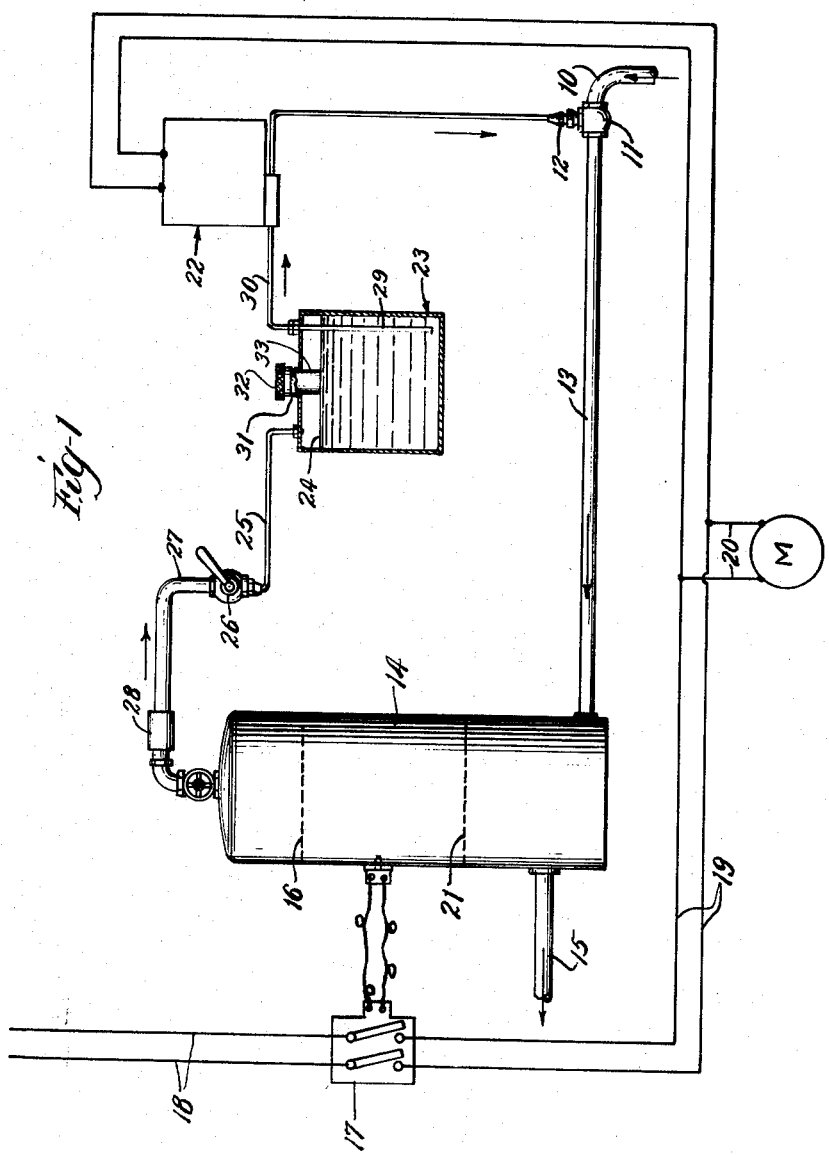
Fig. 1 is a schematic view of a water supply system of the type widely used for private domestic water supplies incorporating the pressurized dosage system of the present invention.

A private water system, such as that supplied by a well, is shown in Fig. 1 as including a pipe or line 10 which is connected to a discharge opening of an electric well pump (not shown). The well pump is of a known type which may be submerged in the well for purposes of delivering water therefrom into the water system illustrated. The pipe or discharge line 10 communicates with a T-fitting 11 in which is received a check valve 12 of a type and for a purpose to be described. A pipe 13 extends from the fitting 11 into communication with a pressure storage tank 14 of a known type in which a substantial quantity of treated water is stored in an available manner for immediate use through an outlet line 15. The storage tank 14 is completely enclosed and is provided with a head space at the top thereof wherein a cushion of air is compressed during filling of the tank 14 through the line 13 to a height such as indicated by the broken line 16.

Operation of the well pump to which the line 10 is connected is controlled by a pressure-actuated switch 17 suitably connected with an electric service line 18 providing, for example, 110 volt alternating current. The switch 17 is connected by leads 19 to supply leads 20 for the motor of the well pump. The control switch 17 is pre-set so as to automatically close and energize the well pump when the pressure in the tank 14 drops to, say, 20 pounds per square inch which would result in the lowering of the liquid level of the tank 14 from the line 16 to the broken line 21. With the control switch 17 automatically closed and the pump operating to deliver water from the well through the line 10, fitting 11 and line 13 into the tank 14, subsequent raising of the level 14 from approximately the line 21 to the line 16 results in automatic opening of the switch 17 to de-energize the pump at which point the pressure in the tank 14 would be increased to, say 40 pounds per square inch.

Operatively connected to the water storage and supply system described is the improved pressurized dosage system of the present invention which includes a dosage control unit 22 electrically connected by leads in parallel circuit relation with the pump motor circuit 20 being thus energized electrically at the same time and for the same duration as the pump. The pressurized dosage system includes a treating liquid storage container 23 containing therein a level of treating liquid defined by the broken line 24. This level of liquid is not exceeded during the use of the pressurized dosage system in order to establish in the container 23 a pressurized air head space which is in communication with the head space of the storage tank 14. This communication is established by a line 25 (which may be flexible if preferred) attached at one end to the top of the container 23 and attached at the other end to a combination shut-off and venting valve 26. A line 27 runs from the valve 26 into communication with the head space of the tank 14 and has inserted therein a check-valve assembly 28 for the purpose to be described.

Received within the container 23 through the top thereof is a treating liquid delivery tube 29 which extends substantially downwardly into the container and is attached to one end of a flexible supply tube 30 which extends through a portion of the dosage control unit 22 and is attached at its other end to the check valve 12 carried in the fitting 11 on the pressure side of the pump. The top of the container 23 is provided with a neck-like portion 31 which defines an opening through which treating liquid is introduced into the container, a removable cap 32 being received about the top of the filling neck 31. Associated with the neck 31 and directly below the same is a filling tube 33 of known type which serves to limit the height to which the container 23 may be filled with treating liquid. In this manner the preservation of the head space above the liquid level 24 is assured.

By interconnecting the head space of the storage tank 14 with the head space of the treating liquid container 23, maximum air pressure developed in the storage tank 14 by filling of the same to the level 16 is transmitted through the line 27 including the check valve 28, valve 26 and line 25 into the head space of the container 23 to place the treating liquid therein under that pressurization. The impressing of air pressure on the top of the treating liquid in the container 23 provides the same with means for instantaneously discharging small quantities of liquid through the tubes 29 and 30, past the check valve 12 and into the water line 13 upon operation of the dosage control unit 22 in a manner to be described. The check valve 12 prevents flow of water or liquid carried in the line 10 and fitting 11 in a reverse direction through the flexible tube 30 and into the container 23. The check valve 28 functions to prevent reverse flow of air from the container 23 into the tank 14. In the absence of the check valve 28 a reversing of the direction of air flow would occur upon the lowering of the liquid level in the tank 14 toward the lowermost level 20 by withdrawal of the liquid through the pipe 15. Use of liquid from the tank 14 results in decompression of the air contained therein accompanied by a substantial drop in pressure of the same. By use of the check valve 28, air delivered from the tank 14 to the container 23 is prevented from returning to the tank 14 upon an appreciable reduction in air pressure therein thus resulting in constantly maintaining of the requisite air pressure in the head space of the container 23 to provide for instantaneous flow of the treating liquid through the dosage line 30 upon operation of the unit 22.

By way of example, the tank 14 may develop 40 pounds per square inch pressure upon filling of the same to the level defined by the line 16. Air compressed in the head space of the tank 14 will be approximately under a pressure of 40 pounds per square inch. Small quantities of the compressed air flow through the check valve 28, line 27, valve 26, and line 25 into the head space of the container 23 to maintain the treating liquid therein under a pressure equal to the pressure source of 40 pounds per square inch. Upon use of the water in the tank 14 to an extent that the level of the same drops towards the lower level line 20, the air pressure therein is reduced accordingly but the 40 pounds per square inch established in the head space of the container 23 is retained therein by reason of the one-way operation of the check valve 28. Once the air pressure contained in the head space of the container 23, the line 25, valve 26, and the line 27 exceeds that of the air pressure in the tank 14, the check valve 28 functions to prevent reverse flow of air back into the tank 14. The pressure in the dosage liquid container 23 is always greater than the pressure on the water line 13 at the fitting 11 during the period from first use of water out of the tank 14 until the pump is actuated. Thus, the treating liquid contained in the container 23 is pressurized at all times for instantaneous feeding through the line 30 upon operation of the control unit 22.

Replacement air is supplied to the tank 14 in the known manner by use of a valve system of a type disclosed in U.S. Patent No. 2,183,421. Any conventional air delivery arrangement can be used to retain the pressurized feature of operation of the tank 14, replacement air being necessary due to loss of air from the tank 14 such as by absorption of the same in the water stored therein.

Filling of the container 23 to replace treating liquid such as the chlorine solution therein is accomplished through the filling neck 31 upon removal of the cap 32. In order to initially vent the head space of the container 23 for filling purposes, the valve 26 is supplied. Suitable operation of the valve 26 vents the head space of the container 23 through the line 25 and, in addition, closes the line 27 to prevent loss of air pressure from the head space of the tank 14. Upon completion of the filling of the container 23 and upon replacement of the cap 32, the valve 26 is actuated to re-establish communication between the head space of the tank 14 and the head space of the container 23.

Referring to Figs. 2, 3 and 4, the control unit 22 includes a housing indicated generally at 35, the bottom panel 36 of which has secured thereto by screws 38—38 the frame of a conventional electric clock motor 37. It will be understood that the small synchronous motor 37 may be replaced by any other suitable timing motor. A pair of notched timing disks 39 and 40 are mounted on the drive shaft 41 of the motor 37, the rearmost disk 39, as viewed in Fig. 2, being rigidly secured on this shaft while the forward disk 40 is rotatively adjustable thereon. The disk 40 is clamped on the shaft 41 in any desired position by means of a knurled nut 42.

The disks 39 and 40 may have the same size and shape and normally are angullarly offset in relation to one another thereby presenting diametrically opposed notches 43—43 where the outermost peripheries of the disks do not overlap. The angular or arcuate size of these notches 43 may be adjusted by turning the disk 40 on the shaft 41, and then clamping the same in the desired position. The oppositely positioned notches 43 are such that one can be completely closed by turning the disk 40 to leave the remaining notch with a very slight gap for fast snap-action valve operation where finest dosage is required. The angular width of the depressions 43 determines the duration of the valving cycle and the operation of the unit 22.

A normally opened control switch 44 of known commercial type is suitably mounted on the frame of clock motor 37 with an actuating finger 45 being spring-pressed against the peripheries of the timing disks 39 and 40. The switch 44 is in the open condition as long as the finger 45 rides on the periphery of either disk 39 or 40. When the end of the finger 45 drops into one of the notches 43, the switch is closed. The leads or conductors 20 are connected to two terminals 46 and 47 of the clock motor 37 as well as suitable terminals of the pump motor so that the clock and pump motors are in the same circuit and are energized with the shaft 41 rotating during the entire period that the switch 17 is closed.

One terminal of the coil 48 of a solenoid device 49 is connected by a conductor 50 to the terminal 46 of the motor 37. One terminal of the switch 44 is connected by a suitable conductor to the other terminal 47 of the motor 37. The remaining terminal of the coil 48 is connected by a conductor 51 to the remaining terminal of the switch 44. Thus the coil 48 is connected in parallel circuit relation with the clock motor 37 and is energized only when the switch 44 is closed.

The solenoid device 49 is mounted on an appropriate rigid bracket 52 of L-shaped outline which is secured to the housing 35 by two of a set of four bolt and nut fasteners 53 having a further function to be described. The armature of the solenoid, the bottom projecting end of which is indicated at 54, has a plunger 55 secured thereon which is reciprocable in a vertical direction through a slot opening in a small sub-bracket 56 rigidly welded on the larger L-shaped bracket 52. A washer or disk 57 is fastened to the lower end of the plunger 55. This washer fits over a slot in the horizontal foot 58 of the bracket 52 and a registering slot in the bottom panel 36 of the housing 35. The bottom end of the plunger 55 projects externally of the housing 35.

A coil compression spring 59 fits over the plunger 55 and is maintained under compression between the bracket 56 at the top and the washer 57 at the bottom. The strength of the spring 59 is such as to hold the washer 57 down against the foot 58 except when the solenoid is energized. Energization of the solenoid 49 provides sufficient strength to overcome the force of the spring 59 and lift the plunger 55. By means of this arrangement it is seen that spring 59 engaging washer 57 on the plunger 55, will instantaneously drive the same outwardly (or downwardly as illustrated in Fig. 2) with a snap-action whenever solenoid coil 48 is de-energized. Washer 57 limits the spring-urged movement of the plunger 55 by engaging bracket foot 58.

The outer extremity of the plunger 55 is shaped to provide a rounded nose pinch-off valve blade 60 which acts without injury on a valve member 61 in the form of a short length of flexible (e.g. rubber) tubing. The adjacent ends of the treating liquid supply tubing 30 are fitted in liquid tight relation to the ends of the tubular valve member 61 as shown. The tubular valve member 61 is clamped between a pair of mating plates or members 62 and 63. The mating faces of the plates 62 and 63 are provided with aligned grooves 64 extending from end to end thereof in which the valve member 61 is nested. The upper plate 62 has at its mid-point a slot 65 to accommodate the valve blade 60. The groove in the bottom support plate 63 is provided with a boss or anvil 66 against which the tubular valve element 61 is pinched by the blade 60 under the force of the spring 59. The washer 57 is so placed as to allow the blade to pinch the tube 61 closed against the anvil 66 but prevents the full force of the spring from being borne by the tube 61. The grooves in the plate 62 and 63 are widened at the boss 66 as shown in Fig. 3 so as to provide space for the flattening out of the valve member 61. The clamping plates 62 and 63 are held in registered relation to one another, as well as being made fast to housing 35, by means of the bolt and nut securing members 53 referred to above.

Since the plates 62 and 63 serve not only to clamp but also to support the tubular valve member 61, the member 61 can be made of highly flexible tubing. Thus, a high pressure in the dosage system which would normally distend and burst the valve member 61 does not do so because of the support it receives from the plates 62 and 63. The rounded blade end 60 of the plunger 55 helps prevent the tube 61 from bulging out through the opening 65 in the top clamp plate 62.

In Fig. 2 a check valve fitting 68, constituting the check valve 12, is illustrated connected with the line 30 for housing in the fitting 11 of the pipes 10 and 13 of the water supply system. The valve fitting 68 includes an externally threaded hollow plug-type fitting 69 which is threadedly received within the T-fitting 11 in a conventional manner. The fitting 69 is provided with a spherical rounded discharge extremity 70 which is provided, for example, with a simple elastic check valve 71 in the form of a collapsed rubber tube, the valve having a discharge nose 72 slitted at 73 for one way, non-return and relatively friction-free flow of liquid from the dosage delivery tube 30. The check valve 28 is similarly constructed with the discharge nose 72 of the non-return discharge extremity 70 thereof being pointed toward the valve 26 and container 23 in a direction to prevent reverse flow of pressurized air from the container 23 into the head space of the storage tank 14.

As previously described, pressurized air is carried in the head space of the treating liquid container 23 at all times to place the liquid therein under adaquate pressure to provide for instantaneous flow of liquid through the line 30 past the dosage control unit 22 when the valve element thereof is opened, and subsequently into the liquid carried in the lines 10 and 13 through the check valve 12 which is located on the pressure side of the pump. When the pressure drops in the storage tank 14 to the predetermined lower limit, such as 20 pounds per square inch, the control switch 17 is closed and both the motor of the pump and the timing motor 37 of the dosage control unit 22 are energized. These motors continue to be energized (e.g. for about three minutes) until the upper predetermined pressure is reached in the tank 14, such as 40 pounds per square inch, whereupon the switch 17 is automatically opened. The disks 39 and 40 turn when the motor 37 is energized at the rate, for example of one r.p.m. During each revolution the switch 44 will be closed two times and a typical setting of the notches 43 is such that the switch is closed for one-twentieth of a revolution (e.g. one-twentieth of a minute) if the drive shaft 41 turns at the rate of one r.p.m.

Each time the switch 44 is closed, the solenoid coil 48 is energized and the plunger member 55 is retracted with a snap-action so as to fully release the tubular valve member 61. The pressure carried in the head space of the container 23 will immediately force treating liquid from the container 23 through the tube 30, valve member 61 and check valve 12. At the instant that the solenoid coil 48 is de-energized, the spring 59 closes the valve member 61 with a snap-action so as to completely shut off the flow of treating liquid.

Increased or decreased doses of the treating liquid are obtained by setting the gaps 43 to the desired width. It is possible to adjust the dosage control unit 22 so as to accurately discharge doses as small as four drops. The unit can likewise be adjusted to accurately discharge doses many times larger. Pressurization of the treating liquid in the manner described allows dosage of the water during delivery thereof at any point on the pressure side of the pump. This eliminates the difficulties present in systems wherein it is necessary to dose through the suction side of the pump particularly where the pump is relatively inaccessible due to submersion in a water supplying well. With pressurization of the treating liquid, maximum dosage is obtained during maximum liquid flow into the storage tank 14. Upon initial operation of the pump, the pressure in the tank 14 is at its lowest point and maximum liquid flow results. By reason of the trapping of pressurized air in the container 23, the treating liquid is under maximum pressure resulting in maximum flow for dosage purposes.

It will be apparent that many changes may be made in the embodiment of the invention described and that additional embodiments of the invention may be made without departing from the spirit and scope of the invention. Accordingly, all matters described above and shown in the accompanying drawings are intended to be interpreted as illustrative and not in a limiting sense.

What is claimed as new is:

1. In combination with a liquid storage and supply system including an enclosed liquid storage means providing a head space portion in which air is confined and compressed by liquid introduced into said liquid storage means below said head space portion, a conduit for transmission of liquid into said liquid storage means, flow-transmitting means forming a part of said conduit, and pressure responsive switch means in communication with said liquid storage means and operatively connected with said flow-transmitting means to operate the same upon a predetermined decrease in pressure in said liquid storage means; a dosage system operable to discharge a quantity of treating liquid into the liquid of said storage and supply system, said dosage system comprising an enclosed treating liquid storage means provided with a head space portion in communication with the surface of a quantity of treating liquid contained in said treating liquid storage means, one way flow conduit means interconnecting the head space portion of said liquid storage means and the head space portion of said treating liquid storage means to transfer compressed air from the head space portion of said liquid storage means to the head space portion of said treating liquid storage means while preventing reverse transfer thereof to said liquid storage means upon a reduction in head space pressure therein, a treating liquid conduit communicating said treating liquid storage means with the liquid of said storage and supply system at a point in said system to dose the liquid therein, and valve means operatively associated with said treating liquid conduit to control dosing of said liquid, said valve means including control means operatively connected with said pressure responsive switch means to be operative with said flow-transmitting means when liquid is delivered thereby to said liquid storage means.

2. In combination with a liquid storage and supply system including an enclosed liquid storage means providing a head space portion in which air is confined and compressed by liquid introduced into said liquid storage means below said head space portion, a conduit for transmission of liquid into said liquid storage means, flow-transmitting means forming a part of said conduit, and pressure responsive switch means in communication with said liquid storage means and operatively connected with said flow-transmitting means to operate the same upon a predetermined decrease in pressure in said liquid storage means; a dosage system operable to discharge a quantity of treating liquid into the liquid of said storage and supply system on the pressure side of said flow-transmitting means, said dosage system comprising an enclosed treating liquid storage means provided with a head space portion in communication with the surface of a quantity of treating liquid contained in said treating liquid storage means, one way flow conduit means interconnecting the head space portion of said liquid storage means and the head space portion of said treating liquid storage means to transfer compressed air from the head space portion of said liquid storage means to the head space portion of said treating liquid storage·means while preventing reverse transfer thereof to said liquid storage means upon a reduction in head space pressure therein to maintain said treating liquid under adequate delivery pressure at all times during the operation of said system, a treating liquid conduit communicating said treating liquid storage means with the liquid of said storage and supply system at a point in said system on the pressure side of said flow-transmitting means to dose the liquid therein, and valve means operatively associated with said treating liquid conduit to control dosing of said liquid, said valve means including control means operatively connected with said pressure responsive switch means to be operative with said flow-transmitting means when liquid is delivered thereby to said liquid storage means.

3. In combination with a liquid storage and supply system including an enclosed liquid storage means providing a head space portion in which air is confined and compressed by liquid introduced into said liquid storage means below said head space portion, a conduit for transmission of liquid into said liquid storage means, flow-transmtting means forming a part of said conduit, and pressure responsive switch means in communication with said liquid storage means and operatively connected with said flow-transmitting means to operate the same upon a predetermined decrease in pressure in said liquid storage means; a dosage system operable to discharge a quantity of treating liquid into the liquid of said storage and supply system, said dosage system comprising an enclosed treating liquid storage means provided with a head space portion in communication with the surface of a quantity of treating liquid contained in said treating liquid storage means, one way flow conduit means interconnecting the head space portion of said liquid storage means and the head space portion of said treating liquid storage means to transfer compressed air from the head space portion of said liquid storage means to the head space portion of said treating liquid storage means while preventing reverse transfer thereof to said liquid storage means upon a reduction in head space pressure therein, a treating liquid conduit communicating said treating liquid storage means with the liquid of said storage and supply system at a point in said system to dose the liquid therein, and valve means operatively associated with said treating liquid conduit to control dosing of said liquid, said valve means including control means connected with said flow-transmitting means to be operative therewith in response to the closing of said pressure responsive switch means during delivery of liquid to said liquid storage means.

4. In combination with a liquid storage and supply system including an enclosed liquid storage means providing a head space portion in which air is confined and compressed by liquid introduced into said liquid storage means below said head space portion, a conduit for transmission of liquid into said liquid storage means, flow-transmtting means forming a part of said conduit, and pressure responsive switch means in communication with said liquid storage means and operatvely connected with said flow-transmitting means to operate the same upon a predetermined decrease in pressure in said liquid storage means; a dosage system operable to discharge a quantity of treating liquid into the liquid of said storage and supply system on the pressure side of said flow-transmitting means, said dosage system comprising an enclosed treating liquid storage means provided with a head space portion in communication with the surface of a quantity of treating liquid contained in said treating liquid storage means, one way flow conduit means interconnecting the head space portion of said liquid storage means and the head space portion of said treating liquid storage means to transfer compressed air from the head space portion of said liquid storage means to the head space portion of said treating liquid storage means while preventing reverse transfer thereof to said liquid storage means upon a reduction in head space pressure therein to maintain said treating liquid under adequate delivery pressure at all times during the operation of said system, a treating liquid conduit communicating said treating liquid storage means with the liquid of said storage and supply system at a point in said system on the pressure side of said flow-transmitting means to dose the liquid therein, and valve means operatively associated wtih said treating liquid conduit to control dosing of said liquid, said valve means including control means connected with said flow-transmitting means to be operative therewith in response to the closing of said pressure responsive switch means during delivery of liquid to said liquid storage means.

5. The system of claim 4 wherein said control means includes a timing motor operatively connected with said flow-transmitting means to run concurerntly with the operation thereof, and valve operating means operatively connecting a valve element with said timing motor to periodically operate said element to open and close said treating liquid conduit during periods of sustained operation of said timing motor.

6. The system of claim 4 wherein said control means includes a timing motor operatively connected with said flow-transmitting means to run concurrently with the operation thereof, and valve operating means operatively connecting a valve element with said timing motor to periodically operate said element to open and close said treating liquid conduit during periods of sustained operation of said timing motor, said valve element being in the form of a reciprocable plunger which operates to pinch-off in constricting closed condition a section of flexible tubing constituting a part of said treating liquid conduit.

7. The system of claim 4 wherein said one way flow conduit means includes conduit closing and venting means operable to seal off the head space portion of said liquid storage means while venting the head space portion of the treating liquid storage means for treating liquid filling purposes.

8. The system of claim 6 wherein said one way flow conduit means includes conduit closing and venting means operable to seal the head space portion of said liquid storage means while venting the head space portion of the treating liquid storage means for treating liquid filling purposes.

(References on following page)

References Cited in the file of this patent

UNITED STATES PATENTS

| | | |
|---|---|---|
| 547,436 | Hoyt | Oct. 8, 1895 |
| 2,012,406 | Savell | Aug. 27, 1935 |
| 2,254,833 | Ashkenaz | Sept. 2, 1941 |
| 2,355,232 | Nelson | Aug. 8, 1944 |
| 2,588,212 | Custer | Mar. 4, 1952 |
| 2,645,245 | Maisch | July 14, 1953 |
| 2,674,435 | Angell | Apr. 6, 1954 |
| 2,748,569 | Jackson | June 5, 1956 |
| 2,795,235 | Hoyt | June 11, 1957 |

FOREIGN PATENTS

| | | |
|---|---|---|
| 495,884 | Belgium | June 15, 1950 |
| 980,731 | France | Jan. 3, 1951 |